(12) United States Patent
Pellerito et al.

(10) Patent No.: US 9,797,506 B2
(45) Date of Patent: Oct. 24, 2017

(54) TRANSMISSION NODE SPEED MONITORING

(71) Applicant: GM GLOBAL TECHNOLOGY OPERATIONS LLC, Detroit, MI (US)

(72) Inventors: Brian J. Pellerito, Ortonville, MI (US); Dara Monajemi, Lansing, MI (US); Brian H. Fiore, Waterford, MI (US); Joel H. Gunderson, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 379 days.

(21) Appl. No.: 14/486,481

(22) Filed: Sep. 15, 2014

(65) Prior Publication Data

US 2016/0076643 A1 Mar. 17, 2016

(51) Int. Cl.
*F16H 61/12* (2010.01)
*F16H 59/46* (2006.01)
*F16H 61/686* (2006.01)
*F16H 59/42* (2006.01)

(52) U.S. Cl.
CPC .............. *F16H 61/12* (2013.01); *F16H 59/46* (2013.01); *F16H 61/686* (2013.01); *F16H 59/42* (2013.01); *F16H 2059/465* (2013.01); *F16H 2061/1208* (2013.01)

(58) Field of Classification Search
None
See application file for complete search history.

(56) References Cited

U.S. PATENT DOCUMENTS

| 7,867,135 B2 * | 1/2011 | Wu | B60K 6/445 477/5 |
| 8,886,423 B1 * | 11/2014 | Dlugoss | B60W 10/11 475/292 |
| 2013/0144497 A1 * | 6/2013 | Naqvi | F16H 61/08 701/51 |

* cited by examiner

*Primary Examiner* — Colby M Hansen
(74) *Attorney, Agent, or Firm* — Quinn IP Law

(57) ABSTRACT

A method for monitoring a fixed-gear transmission includes deriving a node speed relationship for each of the planetary gear sets based upon a center distance and a gear ratio and determining equivalent speed parameters for nodes of the planetary gear sets based upon a transmission input speed state, an intermediate node speed state and a transmission output speed state. A clutch slip speed relationship is determined for each of the clutches based upon the node speed relationships for the planetary gear sets and the equivalent speed parameters for nodes of the planetary gear sets. Rotational speed sensors monitor the input transmission speed, the intermediate node speed and the transmission output speed. A clutch slip speed for each of the clutches is determined based upon the respective clutch slip speed relationship and the monitored input transmission speed, the monitored intermediate node speed and the monitored transmission output speed.

17 Claims, 5 Drawing Sheets

TRANSMISSION NODE SPEED MONITORING

TECHNICAL FIELD

The disclosure relates to a torque transmission device and monitoring associated therewith.

BACKGROUND

Transmission devices are employed in motorized vehicles to transfer torque from a torque generative device such as an internal combustion engine to a vehicle driveline for tractive effort in response to an operator request. Transmission devices include gear sets and clutches to transfer torque in one of a plurality of fixed gear ratios. Monitoring operation of a transmission device to detect clutch tie-ups, clutch neutral states and other faults associated with clutch activation and deactivation can be challenging in a transmission device configured with a substantial quantity of fixed gear ratios, e.g., greater than five, due to the relatively small magnitude of incremental change in speed between adjacent fixed gear ratios.

SUMMARY

A fixed-gear transmission including a plurality of planetary gear sets and a plurality of clutches is described. A method for monitoring the fixed-gear transmission includes deriving a node speed relationship for each of the planetary gear sets based upon a center distance and a gear ratio and determining equivalent speed parameters for nodes of the planetary gear sets based upon a transmission input speed state, an intermediate node speed state and a transmission output speed state. A clutch slip speed relationship is determined for each of the clutches based upon the node speed relationships for the planetary gear sets and the equivalent speed parameters for nodes of the planetary gear sets. Rotational speed sensors monitor the input transmission speed, the intermediate node speed and the transmission output speed. A clutch slip speed for each of the clutches is determined based upon the respective clutch slip speed relationship and the monitored input transmission speed, the monitored intermediate node speed and the monitored transmission output speed.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
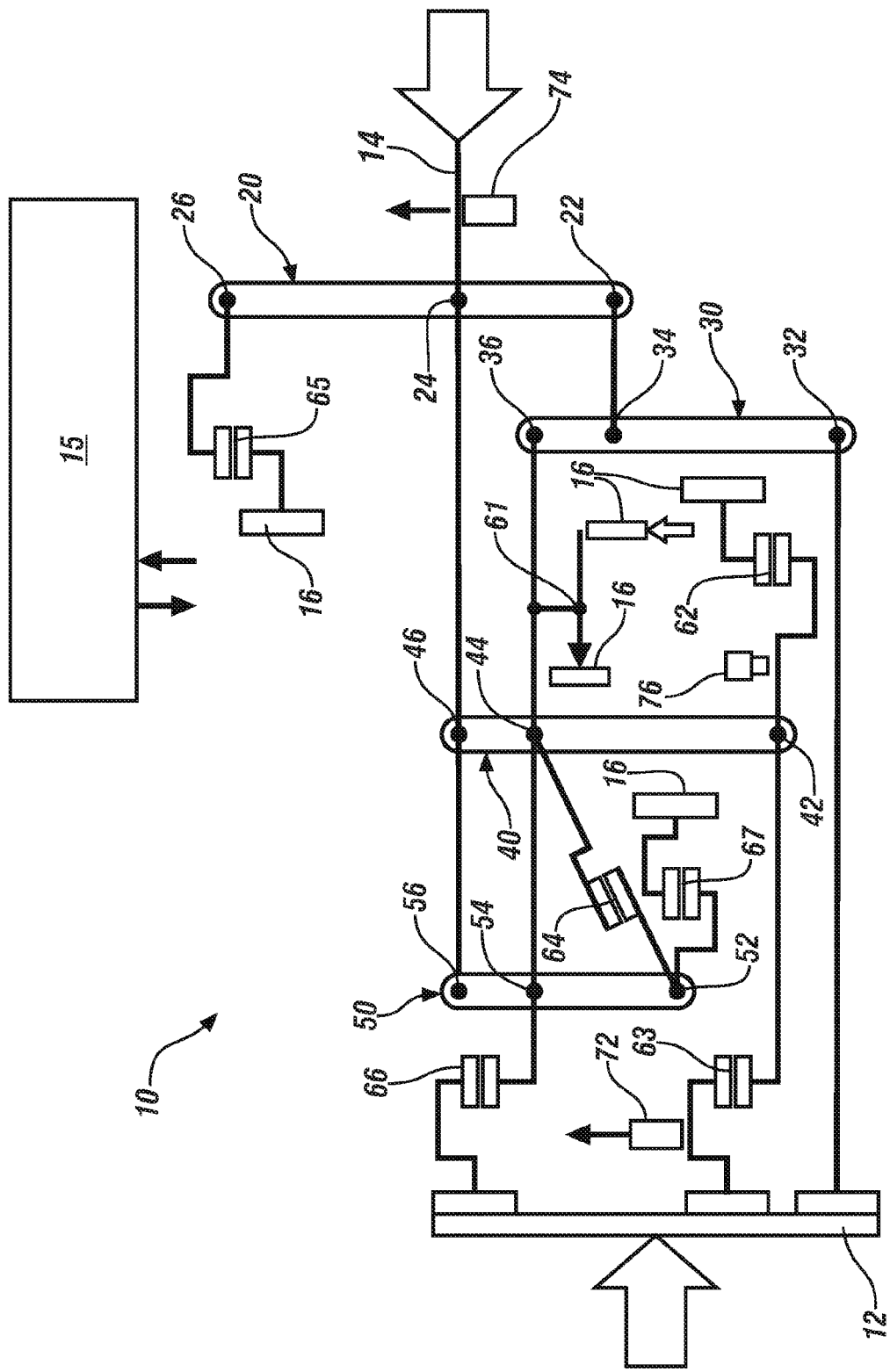
FIG. 1 schematically illustrates a lever diagram of a fixed-gear transmission and accompanying transmission controller, in accordance with the disclosure.

Referring now to the drawings, wherein the depictions are for the purpose of illustrating certain exemplary embodiments only and not for the purpose of limiting the same, FIG. 1 schematically illustrates a lever diagram of a fixed-gear transmission 10 and accompanying transmission controller 15 configured to operate in one of a plurality of fixed gear states. The transmission 10 is illustrative of one embodiment, and provides context for the monitoring routines described with reference to FIGS. 2, 3 and 4.

The transmission 10 is employed to transfer torque between an input member 12 and an output member 14 of a vehicle in one embodiment, with the input member 12 rotatably coupled to a torque generator, e.g., an internal combustion engine, and the output member 14 rotatably coupled to a driveline to deliver tractive torque to vehicle wheels for propulsion. The transmission 10 includes a plurality of interacting planetary gears, including a first planetary gear set 20, a second planetary gear set 30, a third planetary gear set 40 and a fourth planetary gear set 50. As shown, each of the planetary gear sets is a simple planetary gear set including a sun gear, a plurality of planet gears coupled through a common carrier and a ring gear. As such, the first planetary gear set 20 includes first sun gear 22, first planet gears 24 and first ring gear 26, the second planetary gear set 30 includes second sun gear 32, second planet gears 34 and second ring gear 36, the third planetary gear set 40 includes third sun gear 42, third planet gears 44 and third ring gear 46, and the fourth planetary gear set 50 includes fourth sun gear 52, fourth planet gears 54 and fourth ring gear 56. Each of the aforementioned sun gears, planet gears and ring gears correspond to transmission rotational speed nodes. Other transmission configurations and planetary gear sets may be employed, including compound planetary gears.

In one embodiment of the transmission 10, the transmission gearing is configured as follows. The specific values are provided for purposes of illustration and are not intended to limit the concepts described herein. The first planetary gear set 20 is an output gear set having a tooth ratio of 83/37, a nominal ring/carrier gear ratio of 1.0 and a sun/carrier gear ratio of 2.24. The second planetary gear set 30 is an input gear set having a tooth ratio of 83/37, a nominal ring/carrier gear ratio of 1.0 and a sun/carrier gear ratio of 2.24. The third planetary gear set 40 is a reaction gear set having a tooth ratio of 74/25, a nominal ring/carrier gear ratio of 1.0 and a sun/carrier gear ratio of 2.96. The fourth planetary gear set 50 is an overdrive gear set having a tooth ratio of 74/46, a nominal ring/carrier gear ratio of 1.0 and a sun/carrier gear ratio of 1.607. The transmission 10 includes a plurality of controllable clutch and brake elements, including a controllable selectable one-way clutch (CB1R) 61, a first brake (CB38) 62, a first clutch (C57R) 63, a second clutch (C6789) 64, a second brake (CB123456) 65, a third clutch (C4) 66 and a third brake (CB29) 67. As used herein, the terms 'clutch' and 'brake' refer to any type of selectively activatable torque transfer device including single or compound friction plate clutches or packs, band clutches and brakes, and mechanical one-way clutches, for example. A 'clutch' rotatably couples rotation of two rotating elements, and a 'brake' grounds rotation of a rotating element to a transmission case 16. A hydraulic control circuit preferably controlled by transmission controller 15 controls activation and deactivation of the aforementioned clutches and brakes to control power flow through the transmission 10. The aforementioned clutches and brakes may also be referred to in the aggregate as 'clutches'.

The transmission 10 includes a plurality of rotational speed sensors including an input speed sensor 72 that monitors rotational position and speed of the input member 12, an output speed sensor 74 that monitors rotational position and speed of the output member 14 and one or a plurality of intermediate node speed sensor(s) 76. As shown, there is a single intermediate node speed sensor 76 monitoring rotational speed of one of the internal nodes of the transmission 10. Specifically, in this embodiment the intermediate node speed sensor 76 monitors rotational speed of the third sun gear 42. As described with reference to the clutch speed calculation routine 200 depicted in FIG. 2, monitored speeds from the input speed sensor 72, the output speed sensor 74 and the single intermediate node speed sensor 76 can be employed to directly and dynamically calculate a rotational speed at each of the nodes in the illustrated nine-speed transmission 10 using information related to mechanical interconnections of the transmission 10 as expressed in lever diagrams and related analytical tools. In an alternate embodiment including a ten-speed transmission, two intermediate node speed sensors are employed to directly calculate a rotational speed at each of the nodes of the transmission. As shown, the single intermediate node speed sensor 76 monitors rotational speed of the third sun gear 42 of the third planetary gear 40.

The transmission controller 15 dynamically monitors inputs from each of the input speed sensor 72, output speed sensor 74 and the intermediate node speed sensor 76 during operation. Each of the sensors 72, 74, 76 can be any rotational sensing device capable of generating an electrically-readable signal in response to passing of a target element on the rotating member of interest, including by way of example, a Hall-effect sensor, a magnetostrictive sensor, a variable reluctance sensor or another suitable edge sensing device. The target element preferably has a plurality of equally spaced detection edges, e.g., falling edges that are indexed at equivalent magnitudes of rotation. In one embodiment, the target element has sixty (60) equally spaced falling edges that are indexed at 6° of rotation. The target element can employ other quantities of detection edges. Signal output from each of the sensors 72, 74 and 76 may indicate rotational direction, i.e., indicate a forward or a reverse direction of rotation. Application and use of rotational sensing devices is known to those skilled in the art.

Table 1 shows clutch and brake activation and power flow through the transmission 10 for the various gears, wherein the 'X' indicates activation of the respective clutch to effect operation in the indicated gear.

TABLE 1

| Gear | Gear Ratio | Ratio Step | CB1R | CB38 | C57R | C6789 | CB123456 | C4 | CB29 |
|---|---|---|---|---|---|---|---|---|---|
| R | −2.960 |  | X |  | X |  |  |  |  |
| N | — | −0.63 |  |  |  |  |  |  |  |
| 1 | 4.689 |  | X |  |  |  | X |  |  |
| 2 | 3.306 | 1.42 |  |  |  |  | X |  | X |
| 3 | 3.012 | 1.10 |  | X |  |  | X |  |  |
| 4 | 2.446 | 1.23 |  |  |  |  | X | X |  |
| 5 | 1.923 | 1.27 |  |  | X |  | X |  |  |
| 6 | 1.446 | 1.33 |  |  |  | X | X |  |  |
| 7 | 1.000 | 1.45 |  |  | X | X |  |  |  |
| 8 | 0.747 | 1.34 |  | X |  | X |  |  |  |
| 9 | 0.617 | 1.21 |  |  |  | X |  |  | X |

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated memory and storage devices (read only, programmable read only, random access, hard drive, etc.) executing one or more software or firmware programs or routines, combinational logic circuit(s), input/output circuit(s) and devices, signal conditioning and buffer circuitry and other components to provide a described functionality. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds or 3.125, 6.25, 12.5, 25 and 100 milliseconds during ongoing operation. Alternatively, routines may be executed in response to occurrence of an event. Communications between controllers and between controllers, actuators and/or sensors may be accomplished using a direct wired link, a networked communications bus link, a wireless link or any another suitable communications link. The fixed gear transmission 10 provides a non-limiting example of a transmission for the purpose of illustrating the concepts described herein. Other fixed transmissions may employ the concepts described herein with similar effect.

The fixed-gear transmission 10 is dynamically monitored during operation, including monitoring transmission speeds including an intermediate node speed to dynamically detect occurrence of a clutch tie-up or another clutch fault in order to mitigate a change in torque, prevent or minimize a change in vehicle acceleration or deceleration, and avoid unwanted hardware mechanical stress that can reduce service life of the transmission. This can include executing commands to adjust engine torque input to the transmission 10 and other torque control commands.

Figure 2:
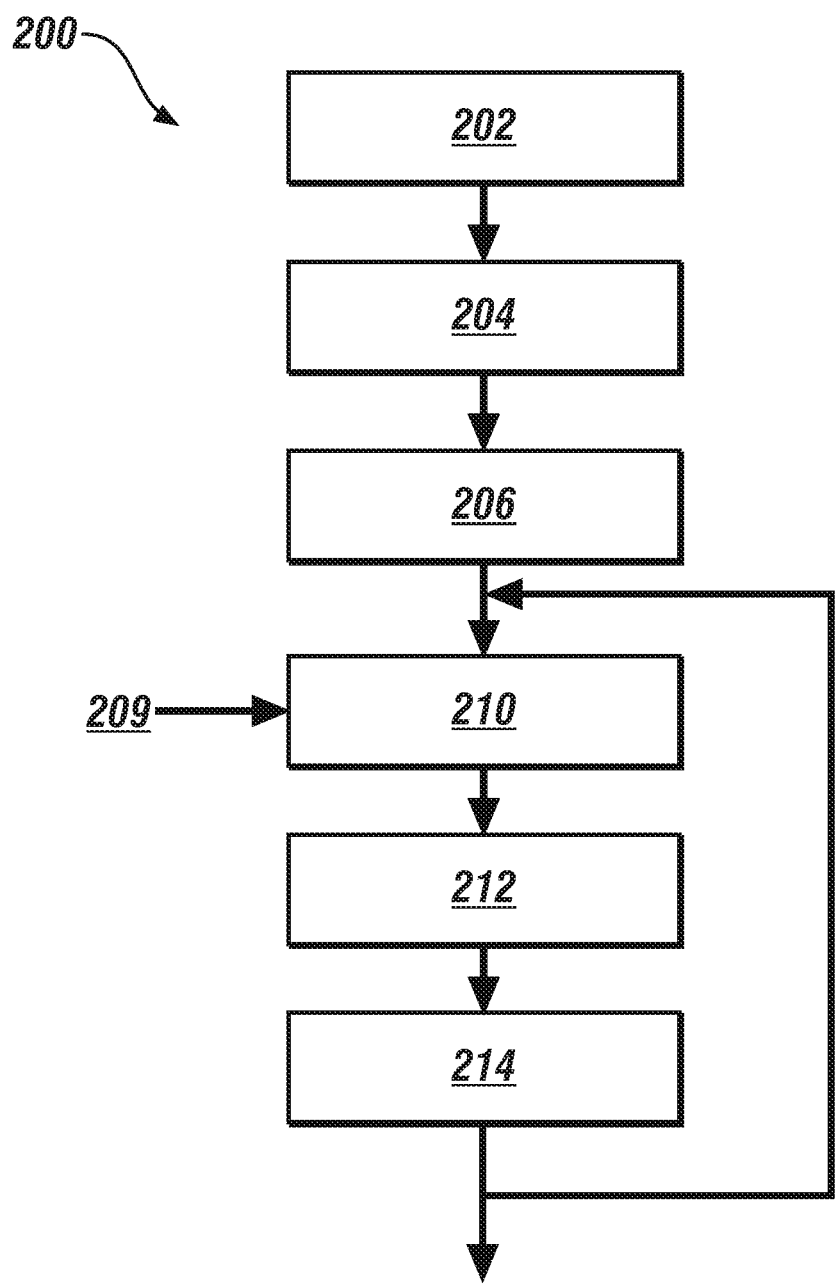
FIG. 2 schematically shows a clutch speed calculation routine that includes determining a clutch slip speed for one of the clutches based upon a respective clutch slip speed relationship and dynamically monitored transmission speeds including transmission input speed, intermediate node speed and transmission output speed, in accordance with the disclosure.

FIG. 2 schematically shows a clutch speed calculation routine 200 that includes a process for determining a clutch slip speed for one of the clutches based upon a respective clutch slip speed relationship and dynamically monitored transmission speeds including transmission input speed, intermediate node speed and transmission output speed. The clutch speed calculation routine 200 is advantageously employed on embodiments of fixed-gear transmission systems employing a plurality of planetary gear sets, and is described with reference to an embodiment of the nine-speed transmission 10 employing four planetary gear sets described with reference to FIG. 1. The concepts of the clutch speed calculation routine 200 can be adapted for implementation with any fixed gear transmission to directly calculate a rotational speed at each of the nodes using information related to mechanics of the transmission as expressed in lever diagrams and related analytical tools and inputs from speed sensors. Table 2 is provided as a key wherein the numerically labeled blocks and the corresponding functions are set forth as follows.

TABLE 2

| BLOCK | BLOCK CONTENTS |
|---|---|
| 202 | Derive node speed relationships for each gear set |
| 204 | Determine equivalent speed parameters for nodes of the planetary gear sets |
| 206 | Derive executable clutch slip speed relationship for each clutch based upon the node speed relationships and the equivalent speed parameters |
| 210 | Monitor inputs from transmission speed sensors |
| 212 | Calculate clutch slip speeds employing the executable clutch slip speed relationships and the monitored inputs from the transmission speed sensors and determine node speeds |
| 214 | Output clutch slip speeds, node speeds |

The clutch speed calculation routine 200 is employed to determine clutch slip speeds for the clutches of the transmission employing equations that define mechanical relationships that are preferably derived off-line, and dynamically executed using dynamically monitored transmission speeds as follows.

A node speed relationship in the form of an equation for each of the planetary gear sets is derived based upon the gear ratios (202). Referring to the gearing configuration of transmission 10 described with reference to FIG. 1, there is a node speed relationship in the form of an equation for each of the first, second, third and fourth planetary gear sets 20, 30, 40 and 50.

The node speed equation for the first planetary gear set 20 including the output gear set having a tooth ratio of 83/37, the nominal ring/carrier gear ratio of 1.0 and the sun/carrier gear ratio of 2.24 is as follows:

$$-b*N_{R1}+(a+b)*N_{C1}-a*N_{S1}=0 \quad [1]$$

wherein:
a is the first sun/carrier gear ratio, which is 2.24 in this embodiment;
b is the first ring/carrier gear ratio, which is 1.0 in this embodiment;
$N_{R1}$ is the rotational speed of the first ring gear 26;
$N_{C1}$ is the rotational speed of the first carrier gear 24; and
$N_{S1}$ is the rotational speed of the first sun gear 22.

The node speed equation for the second planetary gear set 30 including the input gear set having a tooth ratio of 83/37, a nominal ring/carrier gear ratio of 1.0 and a sun/carrier gear ratio of 2.24 is as follows:

$$-d*N_{R2}+(c+d)*N_{C2}-c*N_{S2}=0 \quad [2]$$

wherein:
c is the second sun/carrier gear ratio, which is 2.24 in this embodiment;
d is the second ring/carrier gear ratio, which is 1.0 in this embodiment;
$N_{R2}$ is the rotational speed of the second ring gear 36;
$N_{C2}$ is the rotational speed of the second carrier gear 34; and
$N_{S2}$ is the rotational speed of the second sun gear 32.

The node speed equation for the third planetary gear set 40 including the reaction gear set having a tooth ratio of 74/25, a nominal ring/carrier gear ratio of 1.0 and a sun/carrier gear ratio of 2.96 is as follows:

$$-f*N_{R3}+(e+f)*N_{C3}-e*N_{S3}=0 \quad [3]$$

wherein:
e is the third sun/carrier gear ratio, which is 2.96 in this embodiment;
f is the third ring/carrier gear ratio, which is 1.0 in this embodiment;
$N_{R3}$ is the rotational speed of the third ring gear 46;
$N_{C3}$ is the rotational speed of the third carrier gear 44; and
$N_{S3}$ is the rotational speed of the third sun gear 42.

The node speed equation for the fourth planetary gear set 50 including the overdrive gear set having a tooth ratio of 74/46, a nominal ring/carrier gear ratio of 1.0 and a sun/carrier gear ratio of 1.607:

$$-h*N_{R4}+(g+h)*N_{C4}-g*N_{S4}=0 \quad [4]$$

wherein:
g is the fourth sun/carrier gear ratio, which is 1.607 in this embodiment;
h is the fourth ring/carrier gear ratio, which is 1.0 in this embodiment;
$N_{R4}$ is the rotational speed of the fourth ring gear 56;
$N_{C4}$ is the rotational speed of the fourth carrier gear 54; and
$N_{S4}$ is the rotational speed of the fourth sun gear 52.

Equivalent speed parameters are node speeds that can be determined based upon interconnections of the various nodes of the gear sets and the monitored nodes for the transmission 10, including the input node, the output node and the monitored intermediate node (204). By way of example, equivalent speed parameters for the illustrated transmission 10 include:

$$N_{R4}=N_{R3}=N_{C1}=N_O \quad [5]$$

wherein $N_O$ is the rotational speed of the output member 14, which is monitored by the output speed sensor 74. Other equivalent speed parameters for the illustrated transmission 10 include:

$$N_{C4}=N_{C3} \quad [6]$$

and $$N_{S3}=N_{IS} \quad [7]$$

wherein $N_{IS}$ is the intermediate node speed, which is the rotational speed of the third sun gear 42 of the third planetary gear 40 monitored by the single intermediate node speed sensor 76 as shown.

An executable clutch slip speed equation is derived for each of the clutches based upon the node speed equations and the equivalent speed parameters (206). This includes determining an initial clutch slip speed equation for each of the clutches based upon the node speed equations for the planetary gear sets and the equivalent speed parameters. Each initial clutch slip speed equation is based upon the rotational speeds of the transmission nodes that are tied together when the respective clutch is fully activated and engaged. One example of an initial clutch slip speed equation includes as follows:

$$N\text{slip}(C4) = N_{S4} - N_{C3} \quad [8]$$

wherein Nslip(C4) is clutch slip speed for clutch C4, $N_{S4}$ is the rotational speed of the fourth sun gear 52 and $N_{C3}$ is the rotational speed of the third carrier gear 44 when rotation of the fourth sun gear 52 is tied to rotation of the third carrier gear 44 by activation of clutch C4. Initial clutch slip speed equations for the other clutches can be similarly derived.

By way of illustration, derivation of an executable clutch slip speed equation for one of the clutches based upon the node speed equations and the equivalent speed parameters is now described, using clutch C4 as an example. Clutch C4 ties up elements from the third and fourth planetary gear sets 40, 50 having node speed equations, including EQS. 3 and 4 (above). The equivalent speed parameters are inserted into the node speed equations, including, e.g., EQS. 3 and 4 as follows:

$$-f^*N_O + (e+f)^*N_{C3} - e^*N_{IS} = 0 \quad [9]$$

$$h^*N_O + (g+h)^*N_{C3} - g^*N_{S4} = 0 \quad [10]$$

EQ. 9 is solved for $N_{C3}$ as follows:

$$N_{C3} = (e^*N_{IS} + f^*N_O)/(f+e) \quad [11]$$

The resultant equation for $N_{C3}$ shown in EQ. 11 is substituted into EQ. 10 as follows.

$$-h^*N_O + (g+h)^*(e^*N_{IS} + f^*N_O)/(f+e) - g^*N_{S4} = 0 \quad [12]$$

The resultant equation shown in EQ. 12 is solved for $N_{S4}$ as follows.

$$N_{S4} = \{-h^*N_O + (g+h)^*(e^*N_{IS} + f^*N_O)/(f+e)\}/g \quad [13]$$

The clutch slip for clutch C4 is determined as described in EQ. 8. The resultant for $N_{C3}$ shown in EQ. 11 and the resultant for $N_{S4}$ shown in EQ. 13 are substituted into EQ. 8, yielding the following equation.

$$N\text{slip}(C4) = \{-h^*N_O + (g+h)^*(e^*N_{IS} + f^*N_O)/(f+e)\}/g - (e^*N_{IS} + f^*N_O)/(f+e) \quad [14]$$

Thus, the slip speed for clutch C4 can be calculated using monitored states including the intermediate node speed $N_{IS}$ and the output speed $N_O$. The execution of EQ. 14 can be reduced to algorithmic code that can be dynamically executed each time the intermediate node speed $N_{IS}$ and the output speed $N_O$ are determined through monitoring. A skilled practitioner is able to derive executable clutch slip speed equations for all of the clutches based upon the node speed equations and the equivalent speed parameters using similar substitutions.

During dynamic operating conditions, signal outputs 209 from the rotational speed sensors of the transmission are periodically monitored (210). The signal outputs 209 include, for the embodiment of the transmission 10 shown with reference to FIG. 1, the input speed sensor 72 monitoring the input speed $N_I$ of the input member 12, the output speed sensor 74 monitoring the output speed $N_O$ of the output member 14 and the intermediate node speed sensor 76 monitoring the intermediate node speed $N_{IS}$, which is associated with rotational speed of the third sun gear 42 of the third planetary gear 40. Clutch slip speed for each of the clutches is calculated based upon the respective clutch slip speed equation and the monitored input transmission speed, the monitored intermediate node speed and the monitored transmission output speed, and node speeds are determined for all the transmission nodes (212). The clutch slip speeds and the node speeds are made available for use by other control routines (214), including a transmission clutch slip speed monitoring routine 300 described with reference to FIG. 3 and a transmission node overspeed monitoring routine 400 described with reference to FIG. 4.

Figure 3A:
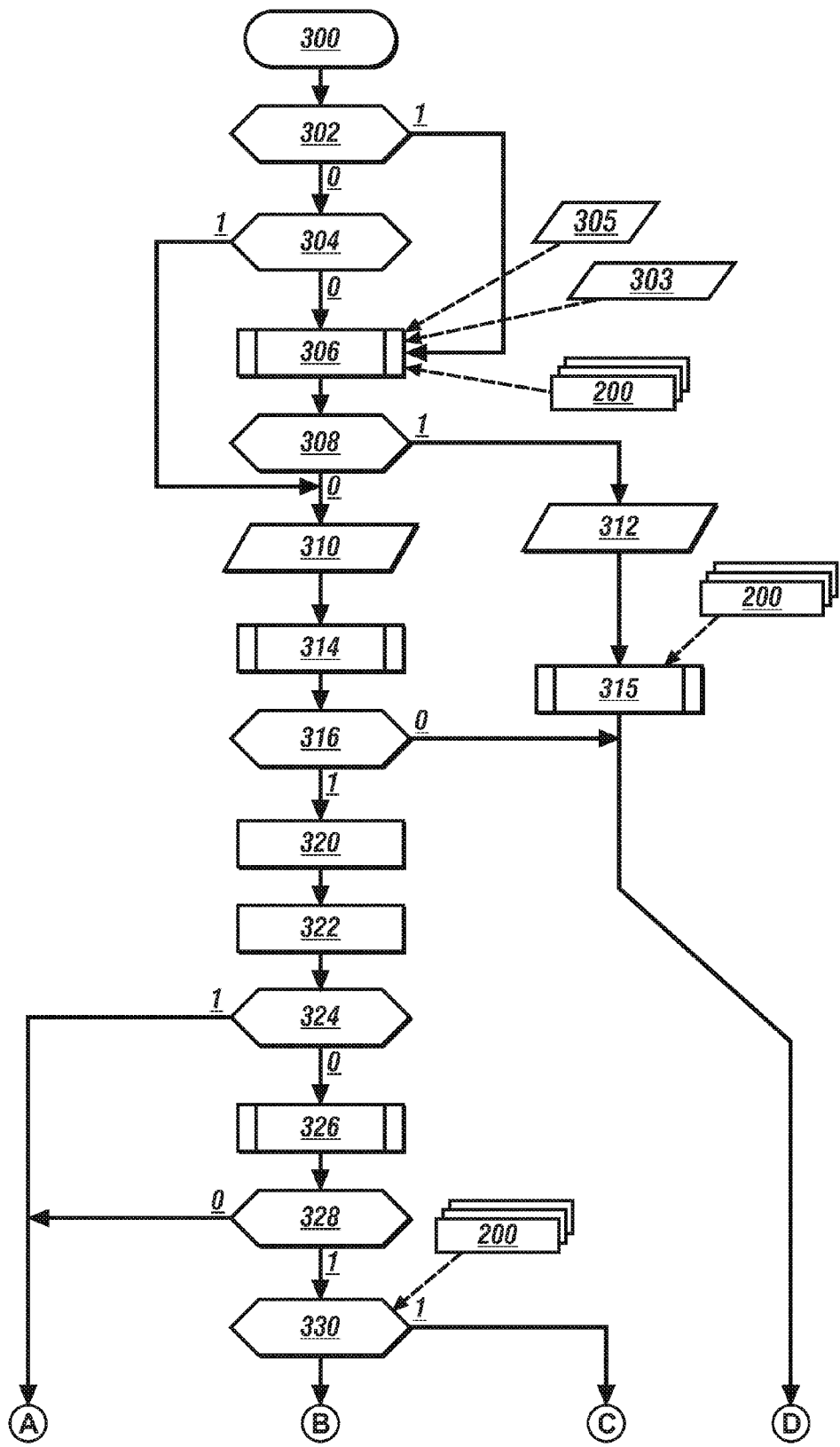
FIG. 3 schematically shows a transmission clutch slip speed monitoring routine that includes a process for detecting occurrence of a clutch fault for the clutches of the transmission based upon the clutch slip speed, in accordance with the disclosure.
Figure 3B:
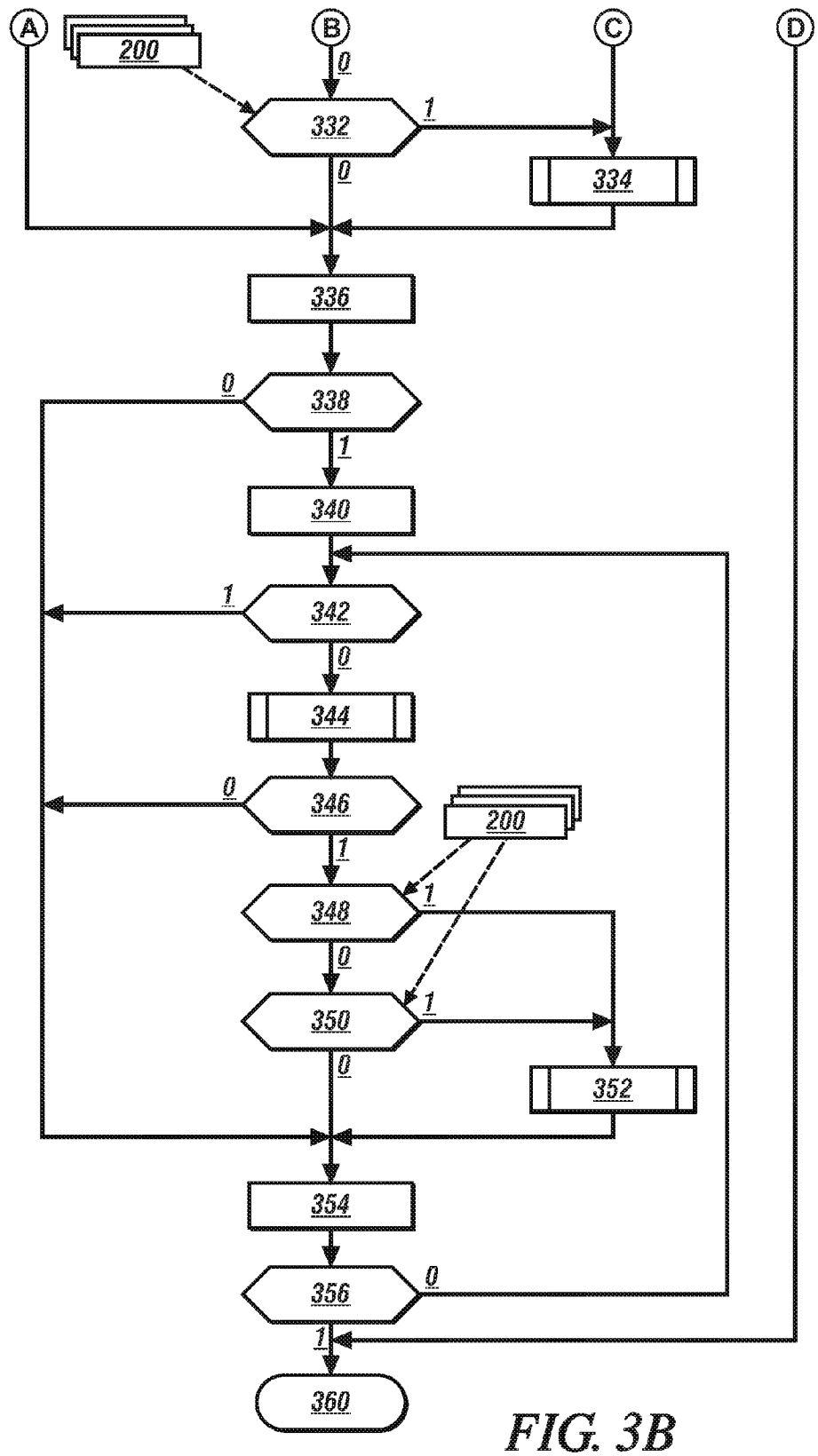

FIG. 3 schematically shows one embodiment of a transmission clutch slip speed monitoring routine 300 that includes evaluating operation of each of the clutches of the transmission 10 based upon the clutch slip speed to dynamically detect occurrence of a clutch fault. This is described employing an embodiment of the transmission system 10 described hereinabove and the clutch speed calculation routine 200 described with reference to FIG. 2. The concepts described herein may be applied to other transmission systems. Table 3 is provided as a key wherein the numerically labeled blocks and the corresponding functions are set forth as follows.

TABLE 3

| BLOCK | BLOCK CONTENTS |
|---|---|
| 300 | Start |
| 302 | Is unintended vehicle deceleration indicated (TRUE)? |
| 304 | Monitor transmission command state for steady-state operation (1) or shift in progress operation (0) |
| 306 | Monitor unintended vehicle deceleration |
| 308 | Is unintended vehicle deceleration occurring? |
| 310 | Unintended vehicle deceleration active |
| 312 | Unintended vehicle deceleration inactive |
| 314 | Determine enable conditions, aborts, suspends, trigger |
| 315 | Mitigate to safe gear |
| 316 | Is monitor enabled? |
| 320 | Identify off-going clutch(es) = F(commanded gear) Identify oncoming clutch(es) = F(commanded gear) |
| 322 | Execute Clutch Tie Up routine For clutch count i = 1 to n off-going clutch(es) |
| 324 | Clutch(i) operational test complete? |
| 326 | Determine off-going clutch conditions |
| 328 | Are off-going clutch conditions met? |
| 330 | Off-going clutch(i) slip speed ≥ pass threshold? |
| 332 | Off-going clutch(i) slip speed ≤ minimum threshold? |
| 334 | Clutch operational test complete for off-going clutch(i) |
| 336 | Increment count i |
| 338 | Clutch count i complete? |
| 340 | Execute Clutch Neutral routine For clutch count j = 1 to m oncoming clutch(es) |
| 342 | Clutch(j) clutch operational test complete? |
| 344 | Determine oncoming clutch conditions |
| 346 | Are oncoming clutch conditions met? |

TABLE 3-continued

| BLOCK | BLOCK CONTENTS |
| --- | --- |
| 348 | Oncoming clutch(j) slip speed ≤ pass threshold? |
| 350 | Oncoming clutch(j) slip speed ≥ maximum threshold? |
| 352 | Determine clutch operational test complete for clutch(j) |
| 354 | Increment j |
| 356 | Oncoming clutch count = m? |
| 360 | End |

The transmission clutch slip speed monitoring routine 300 is periodically executed, e.g., once every 100 microseconds during ongoing operation of the powertrain system. Each execution (300), it is determined whether an active flag has been set indicating that unintended vehicle deceleration has been detected (302). If the active flag has not been set (302)(0), the transmission command state is monitored to determine whether the transmission is presently in steady-state operation (304)(1) or, if a transmission shift is in progress (304)(0). When the active flag has been set indicating that unintended vehicle deceleration has been detected (302)(1) or the transmission is presently in steady-state operation (304)(1), a control routine is executed to monitor unintended vehicle deceleration (306).

The control routine to monitor unintended vehicle deceleration (306) includes monitoring clutch slip speeds for all of the clutches from the clutch speed calculation routine 200, an operator command for vehicle acceleration (305), sensor inputs including a vehicle longitudinal acceleration sensor (303), e.g., an accelerometer, and the output speed sensor to evaluate vehicle deceleration (306). The control routine is able to rationalize unintended vehicle deceleration with an unintended clutch activation or clutch deactivation by comparing the monitored clutch slip speeds with corresponding expected clutch slip speeds for each of the clutches.

The results of the control routine to monitor unintended vehicle deceleration are evaluated (308) and when unintended vehicle deceleration is detected (308)(1), an unintended vehicle deceleration active flag is set (=TRUE) (312). A control routine to mitigate operation and select an achievable gear state is executed (315) and this iteration of the transmission clutch slip speed monitoring routine 300 ends (340).

Each time the clutch speed calculation routine 200 is employed in the transmission clutch slip speed monitoring routine 300, i.e., at steps 306, 315, 330, 348 and 350, it is updated to dynamically provide a most-recent calculation of the clutch speeds for subsequent use in execution of the control routine based upon newly gathered data.

When unintended vehicle deceleration is not detected (308)(0), or when the system indicates that a transmission shift is in progress (304)(0), an unintended vehicle deceleration active flag is not set (=FALSE) (310). In this case, enable criteria are monitored (314), including monitoring incidences of shift aborts, shift suspends and trigger to determine that the clutch monitoring is enabled (316). When not enabled (316)(0), this iteration ends without further action (340).

When enabled (316)(1), oncoming and off-going clutches are identified for the commanded gear shift (320). A clutch tie-up test is executed, which includes evaluating speed of each of the off-going clutches. This includes iteratively selecting and indexing through the off-going clutches (322) for off-going clutches indexed from i=1 through n. This includes evaluating the selected clutch to determine whether it has completed a clutch operational test (324), and if not (324)(0), determine off-going clutch conditions, e.g., occurrence of decreasing clutch pressure (326), and whether they are met (328). When the off-going clutch conditions are met (328)(1), the clutch slip speed for the selected clutch is evaluated to determine if the slip speed is greater than or equal to a pass threshold for slip speed (330). When the slip speed is not greater than or equal to the pass threshold for slip speed (330)(0), the clutch slip speed for the selected clutch evaluated to determine if the slip speed is less than or equal to a minimum threshold for slip speed (332). When the slip speed is greater than or equal to the pass threshold for slip speed (330)(1), or when the slip speed is less than or equal to the minimum threshold for slip speed (332)(1), the routine determine that the clutch operational test for the evaluated clutch is complete (334). When the off-going clutch conditions are not met (328)(0), or when the slip speed is not less than or equal to the minimum threshold for slip speed (332)(0), an off-going clutch counter is indexed (336) and evaluated (338). If all the off-going clutches have not been evaluated (338)(0), the routine loops around to execute the clutch tie-up test for the next off-going clutch (steps 322 through 338). Otherwise (338)(1), the oncoming clutch(es) continue to be monitored.

The control routine to mitigate operation and select an achievable gear state includes monitoring the clutch slip speeds for all of the clutches from the clutch speed calculation routine 200 and evaluating occurrence of intermittent neutral operation to isolate location of a fault and select a safe gear for continued vehicle operation. This operation is now described. The clutch neutral routine executes for each oncoming clutch, with the oncoming clutches indexed from j=1 through m (340). This includes evaluating the selected clutch to determine whether it has completed a clutch operational test (342), and if not (342)(0), determine oncoming clutch conditions, e.g., occurrence of increasing clutch pressure (344), to determine whether they are met (346). When the oncoming clutch conditions are met (346)(1), the clutch slip speed for the selected clutch is evaluated to determine if the slip speed is less than or equal to a pass threshold for slip speed (348). When the slip speed is not less than or equal to the pass threshold for slip speed (348)(0), the clutch slip speed for the selected clutch evaluated to determine if the slip speed is greater than or equal to a maximum threshold for slip speed (350). When the slip speed is less than or equal to the pass threshold for slip speed (348)(1), or when the slip speed is greater than or equal to the maximum threshold for slip speed (350)(1), the routine determines that the clutch operational test for the evaluated clutch is complete (352). When the oncoming clutch conditions are not met (346)(0), or when the slip speed is not greater than or equal to the maximum threshold for slip speed (350)(0), an oncoming clutch counter is indexed (354) and evaluated (356). If all the off-going clutches have not been evaluated (356)(0), the routine loops around to execute the clutch neutral test for the next oncoming clutch (steps 342 through 354). This iteration of the transmission clutch slip speed monitoring routine 300 ends (360).

The transmission clutch slip speed monitoring routine 300 provides transmission internal component overspeed protection and clutch capacity fault detection using transmission nodal speeds and clutch slip speeds, which includes a dynamics-based approach to detect nodal overspeed conditions that can cause transmission faults. Nodal speeds are calculated based on transmission hardware design and are dynamically updated and monitored to immediately trigger transmission hardware protection, including using engine torque control and/or engine speed control to prevent transmission hardware faults when triggered by detection of overspeed conditions at one or a plurality of transmission nodes. Fault detection includes detecting hydraulic circuit faults, clutch control solenoid faults and/or clutch mechanical faults. Such operation also facilitates reduction in diagnostic algorithm complexity and calibration. The dynamic monitoring and detection executes during shift events and steady state gear operation including during shift sequence points to evaluate gear ratio/slip for tie-up detection, allowing for immediate evaluation and decision for tie-up detection and mitigation. This configuration also executes and achieves a result during a single shift event using nodal speeds and individual clutch slip speeds, thus increasing reliability and system robustness.

Figure 4:
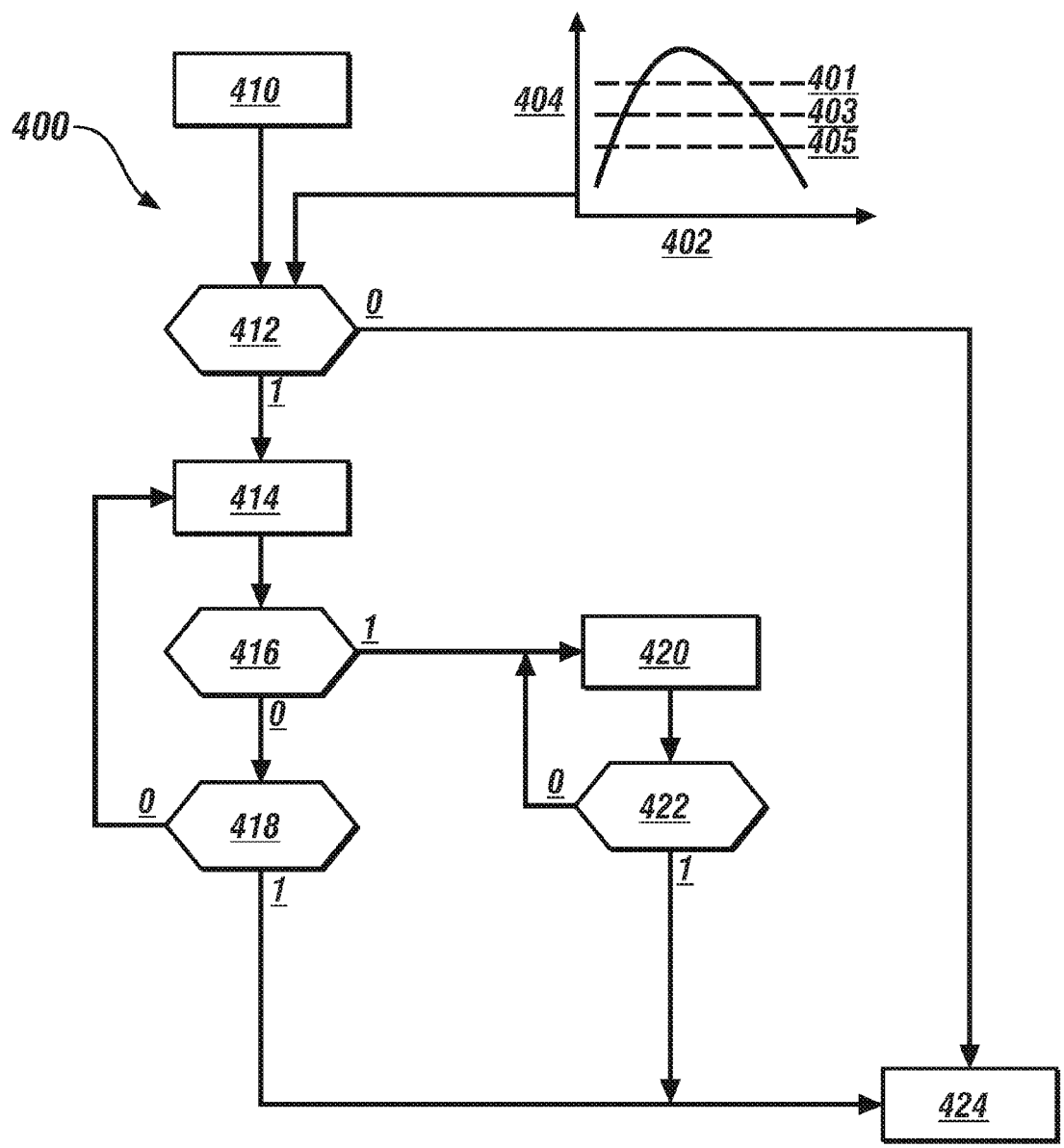
FIG. 4 schematically shows one embodiment of a transmission node overspeed monitoring routine that includes a process for detecting occurrence of a node overspeed condition and mitigating in response, in accordance with the disclosure.

FIG. 4 schematically shows one embodiment of a transmission node overspeed monitoring routine 400 that includes a process for detecting occurrence of a node overspeed condition and mitigating in response. This is described employing an embodiment of the transmission system 10 described hereinabove and the clutch speed calculation routine 200 described with reference to FIG. 2. The concepts described herein may be applied to other transmission systems. Table 4 is provided as a key wherein the numerically labeled blocks and the corresponding functions are set forth as follows.

TABLE 4

| BLOCK | BLOCK CONTENTS |
| --- | --- |
| 410 | Determine node speeds |
| 412 | Is node speed greater than threshold A? |
| 414 | Execute engine speed limiting operation |
| 416 | Is node speed greater than threshold B? |
| 418 | Is node speed less than threshold C? |
| 420 | Continue engine speed limiting operation |
| 422 | Is node speed less than threshold C and has a D-N-D range change occurred? |
| 424 | End |

The transmission node overspeed monitoring routine 400 periodically determines the node speeds for the nodes of the transmission employing the node speed equations described herein for the embodiment of the transmission 10 as part of the clutch speed calculation routine 200 (410). A plurality of node speed thresholds for each node of the transmission is determined, examples of which are shown graphically including speed (RPM) 404 shown in relation to time 402, with speed thresholds including threshold A 403, threshold B 401 and threshold C 405. Threshold A 403 is a nominal node speed, threshold B 401 is an upper node speed associated with an increasing speed condition and threshold C 405 is a lower node speed associated with a decreasing speed condition.

The node speed is compared to threshold A (412). When the node speed exceeds threshold A (412)(1), the transmission issues an engine speed request to limit a transmission input speed state, i.e., engine speed to at or less than a calibrated speed that is less than the engine speed at which the node exceeded threshold A (414). Otherwise (412)(0), this iteration of the routine 400 ends (424).

Node speed continues to be monitored and updated, and is compared to threshold B (416). When the node speed is less than threshold B (416)(0), the routine compares the node speed to threshold C (418). When the node speed continues to be greater than threshold C (418)(0), the transmission continues to issue the engine speed request to limit the transmission input speed state to at or less than a calibrated speed that is less than the engine speed at which the node exceeded threshold A (414). When the node speed decreases to be less than threshold C (418)(1), this iteration ends (424). When the node speed is greater than threshold B (416)(1), the transmission continues to issue the engine speed request. The transmission also commands the transmission to a Neutral range and deactivates all the clutches to free the transmission gearbox of any induced inertias and load. Mitigation strategies are executed to decrease the engine speed to render operation of the transmission in a safe gear state (420). The node speed threshold is compared to threshold C, and the mitigation strategies continue to be executed so long as the node speed threshold is greater than threshold C and a transmission range change that includes a Drive-Neutral-Drive range change has occurred (422)(0). Otherwise (422)(1), this iteration ends (424). By executing thusly employing the calculated node speed for the transmission, the system is able to monitor, detect and mitigate overspeed conditions.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for monitoring a fixed-gear transmission including a plurality of interconnected planetary gear sets and a plurality of selectively activatable clutches during operation, the method comprising:
   deriving a node speed relationship for each of the planetary gear sets based upon gear ratios of the respective planetary gear set;
   determining equivalent speed parameters for nodes of the planetary gear sets based upon a transmission input speed, an intermediate node speed and a transmission output speed;
   determining a clutch slip speed relationship for each of the clutches based upon the node speed relationships for the planetary gear sets and the equivalent speed parameters for the nodes of the planetary gear sets;
   dynamically monitoring, via rotational speed sensors, the transmission input speed, the intermediate node speed and the transmission output speed;
   calculating a clutch slip speed for each of the clutches based upon the respective clutch slip speed relationship and the dynamically monitored transmission input speed, intermediate node speed and transmission output speed; and
   selecting a gear state based upon the clutch slip speed and selectively activating the clutches based upon the selected gear state.

2. The method of claim 1, wherein deriving a node speed relationship for each of the planetary gear sets based upon gear ratios of the respective planetary gear set comprises deriving a node speed relationship based upon a ring gear/carrier gear ratio, a sun gear/carrier gear ratio, and rotational speeds of the ring gear, the carrier gear and the sun gear for the planetary gear set.

3. The method of claim 1, wherein dynamically monitoring, via rotational speed sensors, the transmission input speed, the intermediate node speed and the transmission output speed comprises periodically monitoring signal outputs from the rotational speed sensors associated with the monitored transmission input speed, the intermediate node speed and the transmission output speed during ongoing transmission operation.

4. The method of claim 1, further comprising calculating a node speed for each of the nodes of the planetary gear sets based upon the dynamically monitored input transmission speed, intermediate node speed and transmission output speed, the node speed relationships for the planetary gear sets and the equivalent speed parameters for the nodes of the planetary gear sets.

5. The method of claim 4, further comprising executing a node overspeed detection routine based upon the calculated node speed for each of the nodes of the planetary gear sets.

6. The method of claim 5, further comprising detecting node overspeed condition when the calculated node speed for one of the nodes exceeds a threshold and limiting the transmission input speed based thereon.

7. The method of claim 1, further comprising detecting a clutch fault for one of the clutches based upon the corresponding calculated clutch slip speed.

8. The method of claim 7, wherein detecting a clutch fault for one of the clutches based upon the corresponding calculated clutch slip speed comprises detecting a clutch tie-up for one of the clutches when the calculated clutch slip speed for the clutch is less than a threshold slip speed.

9. The method of claim 7, wherein detecting a clutch fault for one of the clutches based upon the corresponding calculated clutch slip speed comprises detecting a clutch neutral state for one of the clutches when the calculated clutch slip speed for the clutch is greater than a threshold slip speed.

10. A method for monitoring a fixed-gear transmission of a powertrain system that includes a single torque generator, the fixed-gear transmission including a plurality of interconnected planetary gear sets and a plurality of clutches, wherein the single torque generator couples to the fixed-gear transmission via an input member, wherein the fixed-gear transmission includes an intermediate node that is not connected to a torque generating device, and an output member, and wherein the fixed-gear transmission is configured to operate in one of a plurality of fixed gear states to effect torque transfer between the input member and the output member, the method comprising:

deriving a node speed relationship for each of the planetary gear sets;

determining equivalent speed parameters for nodes of the planetary gear sets based upon a transmission input speed, an intermediate node speed and a transmission output speed, wherein the transmission input speed is associated with the input member, the intermediate node speed is associated with the intermediate node, and the transmission output speed is associated with the output member;

determining a clutch slip speed relationship for each of the clutches based upon the node speed relationships for the planetary gear sets and the equivalent speed parameters for the nodes of the planetary gear sets;

dynamically monitoring, via rotational speed sensors, the transmission input speed, the intermediate node speed and the transmission output speed;

calculating a clutch slip speed for each of the clutches based upon the respective clutch slip speed relationship and the dynamically monitored transmission input speed, the intermediate node speed and the transmission output speed; and selecting a gear state based upon the clutch slip speed and selectively activating the clutches based upon the selected gear state.

11. The method of claim 10, wherein deriving a node speed relationship for each of the planetary gear sets comprises deriving a node speed relationship for each of the planetary gear sets based upon a ring gear/carrier gear ratio and a sun gear/carrier gear ratio for the planetary gear set and rotational speeds of the ring gear, the carrier gear and the sun gear for the planetary gear set.

12. The method of claim 10, further comprising calculating a node speed for each of the nodes of the planetary gear sets based upon the dynamically monitored input transmission speed, the at least one intermediate node speed and the transmission output speed, the node speed relationships for the planetary gear sets and the equivalent speed parameters for the nodes of the planetary gear sets.

13. The method of claim 12, further comprising executing a node overspeed detection routine based upon the calculated node speed for each of the nodes of the planetary gear sets.

14. The method of claim 13, further comprising detecting a node overspeed condition when the calculated node speed for one of the nodes exceeds a threshold and controlling operation of the powertrain to limit the transmission input speed based thereon.

15. The method of claim 10, further comprising detecting a clutch fault for one of the clutches based upon the corresponding calculated clutch slip speed.

16. The method of claim 15, wherein detecting a clutch fault for one of the clutches based upon the corresponding calculated clutch slip speed comprises detecting a clutch tie-up for one of the clutches when the calculated clutch slip speed for the clutch is less than a threshold slip speed.

17. The method of claim 16, wherein detecting a clutch fault for one of the clutches based upon the corresponding calculated clutch slip speed comprises detecting a clutch neutral state for one of the clutches when the calculated clutch slip speed for the clutch is greater than a threshold slip speed.

* * * * *